US008803912B1

(12) United States Patent
Fouts

(10) Patent No.: US 8,803,912 B1
(45) Date of Patent: Aug. 12, 2014

(54) SYSTEMS AND METHODS RELATED TO AN INTERACTIVE REPRESENTATIVE REALITY

(76) Inventor: Kenneth Peyton Fouts, Lexington, KY (US)

( * ) Notice: Subject to any disclaimer, the term of this patent is extended or adjusted under 35 U.S.C. 154(b) by 670 days.

(21) Appl. No.: 13/008,590

(22) Filed: Jan. 18, 2011

(51) Int. Cl.
*G09G 5/377* (2006.01)
*G06T 19/00* (2011.01)

(52) U.S. Cl.
CPC .................. *G06T 19/006* (2013.01)
USPC .......................................... 345/629

(58) Field of Classification Search
CPC ....................................... G06T 19/00
USPC ........................................ 345/629
See application file for complete search history.

(56) References Cited

U.S. PATENT DOCUMENTS

| | | | |
|---|---|---|---|
| 7,120,647 B2 * | 10/2006 | Venkatesh et al. | 706/60 |
| 2005/0132305 A1 * | 6/2005 | Guichard et al. | 715/855 |
| 2007/0073562 A1 * | 3/2007 | Brice et al. | 705/5 |
| 2008/0268876 A1 * | 10/2008 | Gelfand et al. | 455/457 |
| 2009/0132941 A1 * | 5/2009 | Pilskalns et al. | 715/764 |
| 2009/0198442 A1 * | 8/2009 | Takagi | 701/201 |
| 2010/0177193 A1 * | 7/2010 | Flores | 348/148 |
| 2010/0205226 A1 * | 8/2010 | Bezancon et al. | 707/803 |
| 2010/0250131 A1 * | 9/2010 | Relyea et al. | 701/213 |
| 2010/0259641 A1 * | 10/2010 | Fujimoto | 348/231.3 |
| 2011/0173565 A1 * | 7/2011 | Ofek et al. | 715/790 |
| 2011/0214047 A1 * | 9/2011 | Pilskalns | 715/205 |
| 2011/0276914 A1 * | 11/2011 | Ahlgren et al. | 715/771 |

\* cited by examiner

*Primary Examiner* — Javid A Amini

(57) ABSTRACT

Disclosed herein are methods and apparatus related to the creation and maintenance of an interactive and explorable representative reality. The interactive representative reality may be compiled from a plurality of geotagged media from a plurality of individual sources. Similarly geotagged images of the geotagged media may be stitched together to form portions of the representative reality. Portions of the representative reality may be layerable spatially and/or temporally. The apparatus and methods disclosed herein provide for recognition of objects within the geotagged images and link the images to one or more related items.

18 Claims, 9 Drawing Sheets

SYSTEMS AND METHODS RELATED TO AN INTERACTIVE REPRESENTATIVE REALITY

CROSS-REFERENCE TO RELATED DOCUMENTS

Not Applicable.

TECHNICAL FIELD

The present invention is directed generally to systems and methods related to an interactive representative reality. More particularly, various inventive methods and apparatus disclosed herein relate to utilization of geotagged media from a plurality of sources to enable creation of and/or interaction with a computer based representative reality.

BACKGROUND

Geotagged media includes digital geotagged images, videos, and/or audio that are created by a recording device such as a digital camera, digital video camera, and/or a digital audio recorder. The geotagged media includes data linking the media with coordinate information regarding the place(s) on earth the geotagged media was recorded. The coordinate information may be generated and/or attached to the media via the recording device (e.g., through a built in or attached global positioning system (GPS) device) and/or through a separate device (e.g., through a computer utilizing media mapping software).

There are multiple methods and forms of geotagging and there are multiple means of representing the coordinates designating a media's geographic location. For example, ICBM format, RDF format, and Microformat may be utilized to implement geotag data in media. Also, for example, latitude and longitude, Universal Transverse Mercator, and Universal Polar Stereographic may be utilized to designate a particular geographic location. Moreover, known algorithms and methods enable conversion between different geotag formats and different geographic coordinate systems. Geotagging can also indicate additional geodata such as the tilt and angle of the device taking the recording.

GPS devices and/or other location determination devices are included in many current cameras, cellular phones, and other image capturing devices. An increasing amount of digital image data associated with photographs taken by such devices contains positioning coordinates of such photos.

Cameras and other recording devices may also be equipped with a wireless device that allows for the quick upload of images and the exchange of information between the camera and another device, computer, and/or internet server. Images are quickly available for manipulation and use as soon as the camera or device uploads them to another device, computer, or internet server. Images that are taken on devices or cameras may also be non-wirelessly uploaded to a device, computer, or internet server via wired upload to the target destination.

Geotagged photographs may currently be uploaded to an application that will link the photograph to a location on a map of the earth. A user can then see where the photos were taken in relation to a globe or map view of the earth.

SUMMARY

The present disclosure is directed to inventive methods and apparatus for an interactive representative reality, and more specifically, for methods and apparatus that utilize geotagged media from a plurality of sources to enable creation of and/or interaction with a computer based representative reality. For example, in certain embodiments the method may include the compiling of a plurality of geotagged media from a plurality of individual sources. The method may further include stitching similarly geotagged images of the geotagged media together to form portions of the representative reality. The method may further include making portions of the representative reality layerable spatially and/or temporally. Also, the method may include the recognition of objects within the representative reality and the linking of the images to one or more related items.

Also, for example, in other embodiments a system may be provided that includes one or more pieces of computer hardware (e.g., a plurality of networked servers) that are programmed to perform one or more of the methods described herein. One or more of the systems and/or methods described herein may receive geotagged media from a plurality of sources and create an interactive representative reality utilizing the plurality of geotagged media. The system may geographically place the media within the representative reality utilizing geotag information from the geotagged media and may also recognize objects within the geotagged media. The recognized objects may be interactive within the representative reality and may be linked with one or more sources of additional information. Moreover, the system may link a plurality of media having similar geotag data to create spatially and/or temporally layerable aspects of the representative reality. For example, the system may temporally link a plurality of media to one another to thereby enable a user to view aspects of the representative reality at different moments in time. Also, for example, the system may dimensionally link a plurality of media to one another to thereby enable a user to view aspects of the representative reality at different perspectives (e.g., a different viewing angle, and/or interiorly/exteriorly).

Thus, generally, in one aspect a computer-implemented method for creating an interactive representative reality is provided. The method includes the steps of receiving a plurality of media from a plurality of individual sources, wherein the media includes a plurality of images; and compiling a plurality of geographically similar images of the images, individually resizing one or more of the geographically similar images, and stitching the geographically similar images to one another to thereby form a portion of a representative reality. The portion of the representative reality formed by the method is at least one of spatially layerable and temporally layerable. The formed portion of the representative reality formed by the method also includes a plurality of singular objects each comprised of images from unique of the individual sources taken on unique dates. The method further includes the steps of analyzing at least the geographically similar images utilized to create the portion of the representative reality for the presence of recognizable objects therein; linking at least some of the recognizable objects of the portion of the representative reality to at least one related item; and making at least some of the recognizable objects interactive recognizable objects within the portion of the representative reality, wherein the interactive recognizable objects are actuable and upon actuation by a user display information relative to the at least one related item.

In some embodiments the method further includes the step of replacing at least some of the recognizable objects within the geographically similar images with predefined object media from a virtual item database. In some versions of those embodiments the predefined object media includes a plurality of three dimensional models. In some versions of those embodiments the predefined object media includes a plurality of high resolution images.

In some embodiments the portion of the representative reality system is both spatially layerable and temporally layerable.

In some embodiments the method further includes the step of linking some of the geographically similar images not utilized to create the portion of the representative reality with the portion of the representative reality and providing a link to enable a user to view one or more of the geographically similar images not utilized to create the portion of the representative reality when viewing the portion of the representative reality. In some versions of those embodiments the method further includes the step of enabling a user to temporally sort the geographically similar images not utilized to create the portion of the representative reality.

In some embodiments the method further includes the step of enabling a user to replace at least some of the portion of the representative reality with a plurality of temporally distinct geographically similar images not utilized to create the portion of the representative reality.

In some embodiments the portion of the representative reality formed by the method is of a smaller size than a city block, includes only objects lining a single street, and the geographically similar images utilized to create the portion of the representative reality includes at least three images recorded on unique dates.

In some embodiments the portion of the representative reality formed by the method is spatially layerable and includes a plurality of images of the singular objects from different vantage points stitched together. In some versions of those embodiments the different vantage points include different viewing angles. Optionally, the different viewing angles include interior viewing angles and exterior viewing angles.

In some embodiments the portion of the representative reality formed by the method is temporally layerable and includes a plurality of interchangeable time periods.

In some embodiments the method further includes the step of linking at least some of the recognizable objects of the portion of the representative reality with geographic data from the geographically similar images in which they are contained. In some versions of those embodiments the linked recognizable objects are otherwise non-geographically indexed. In some versions of those embodiments the method further comprises the step of linking at least some of the recognizable objects of the portion of the representative reality with geographical data from other non-geographically similar images in which they are also contained.

Generally, in another aspect a computer-implemented method for creating an interactive representative reality is provided. The method includes the steps of receiving a plurality of media from a plurality of individual sources, wherein the media includes a plurality of images; compiling a plurality of geographically similar images of the images, individually resizing one or more of the geographically similar images, and stitching the geographically similar images to one another to thereby form a portion of a representative reality. The portion of the representative reality formed by the method is at least one of spatially layerable and temporally layerable. The formed portion of the representative reality formed by the method also includes a plurality of singular objects. The method further includes the steps of analyzing at least the geographically similar images utilized to create the portion of the representative reality for the presence of recognizable objects of the singular objects therein; linking at least some of the recognizable objects of the portion of the representative reality to at least one related item; linking at least some of the recognizable objects of the portion of the representative reality with geographic data from the geographically similar images in which they are contained, wherein at least some of the linked recognizable objects are otherwise non-geographically indexed; and linking at least some of the recognizable objects of the portion of the representative reality with geographical data from other non-geographically similar images in which they are also contained.

In some embodiments the method further includes the step of making at least some of the recognizable objects interactive recognizable objects within the portion of the representative reality, wherein the interactive recognizable objects are actuable and upon actuation by a user display information relative to the at least one related item.

In some embodiments the portion of the representative reality is temporally layerable and includes a plurality of interchangeable time periods.

Generally, in another aspect an apparatus is provided to implement one or more aspects of the methods described herein. The apparatus includes a processor and a storage device coupled to the processor and storing instructions adapted to be executed by the processor to accomplish the above noted method.

Additionally, in another aspect a medium storing instructions adapted to be executed by a processor to perform one or more aspects of the methods described herein is provided.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "controller" is used herein generally to describe various apparatus relating to the performance of one or more of the methods described herein. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a desktop computer, a handheld computer device, a server, a bank of servers) that is conFigured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are conFigured to control one or more of the devices coupled to the network. Generally, multiple devices coupled to the network each may have access to data that is present on the communications medium or media; however, a given device may be "addressable" in that it is conFigured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The present invention is described with narrative and reference to flowcharts and/or diagrams that illustrate methods, apparatus or systems and computer program product. Each portion of the narrative, block of the various flowcharts, and combinations of blocks in the flowcharts, can be implemented by computer program instructions. Such computer program instructions can be loaded onto a general-purpose computer, special purpose computer, or other programmable data processing device to produce a machine, such that the instructions that execute on the computer or other programmable data processing apparatus create means for implementing the functions specified in the flowcharts or elsewhere in this specification. The computer program instructions can also be stored in a computer-readable memory that directs a computer or other programmable data processing device to function in a particular manner, such that the instructions stored in the computer-readable memory produce an article of manufacture including instruction means which implement the function specified in the flowcharts or diagrams. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowcharts or diagrams.

It will be understood that blocks of the flowcharts and other aspects of this specification support combinations of systems for performing the specified functions, combinations of steps for performing the specified functions, and program instructions for performing the specified functions. Each block of the flowcharts or diagrams, combinations of blocks in the flowcharts or diagrams, and other aspects of the specification can be implemented by special-purpose, hardware-based computer systems which perform the specified functions or steps, or combinations of special-purpose hardware and computer instructions.

The present invention can be implemented using any computer programming language, now known or developed in the future. Likewise, various computers and/or processors may be used to carry out the present invention without being limited to those described herein. The present invention can be implemented on conventional desktop computers, such as "IBM"-brand or IBM-compatible "APPLE"-brand or "MACINTOSH"-brand personal computers, utilizing suitable operating systems (e.g., "WINDOWS"-brand operating system, Linux, and the like). ("IBM" is a registered trademark of International Business Machines Corporation, "APPLE" is a registered trademark of Apple, Inc., "MACINTOSH" was once a registered trademark of Apple, Inc., for personal computers, but is now an unregistered mark, "WINDOWS" is a registered trademark of Microsoft Corporation.) The present invention can also be implemented using other types of computers and/or processors, including, but not limited to, mainframe computers, parallel computer arrays, and the like.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
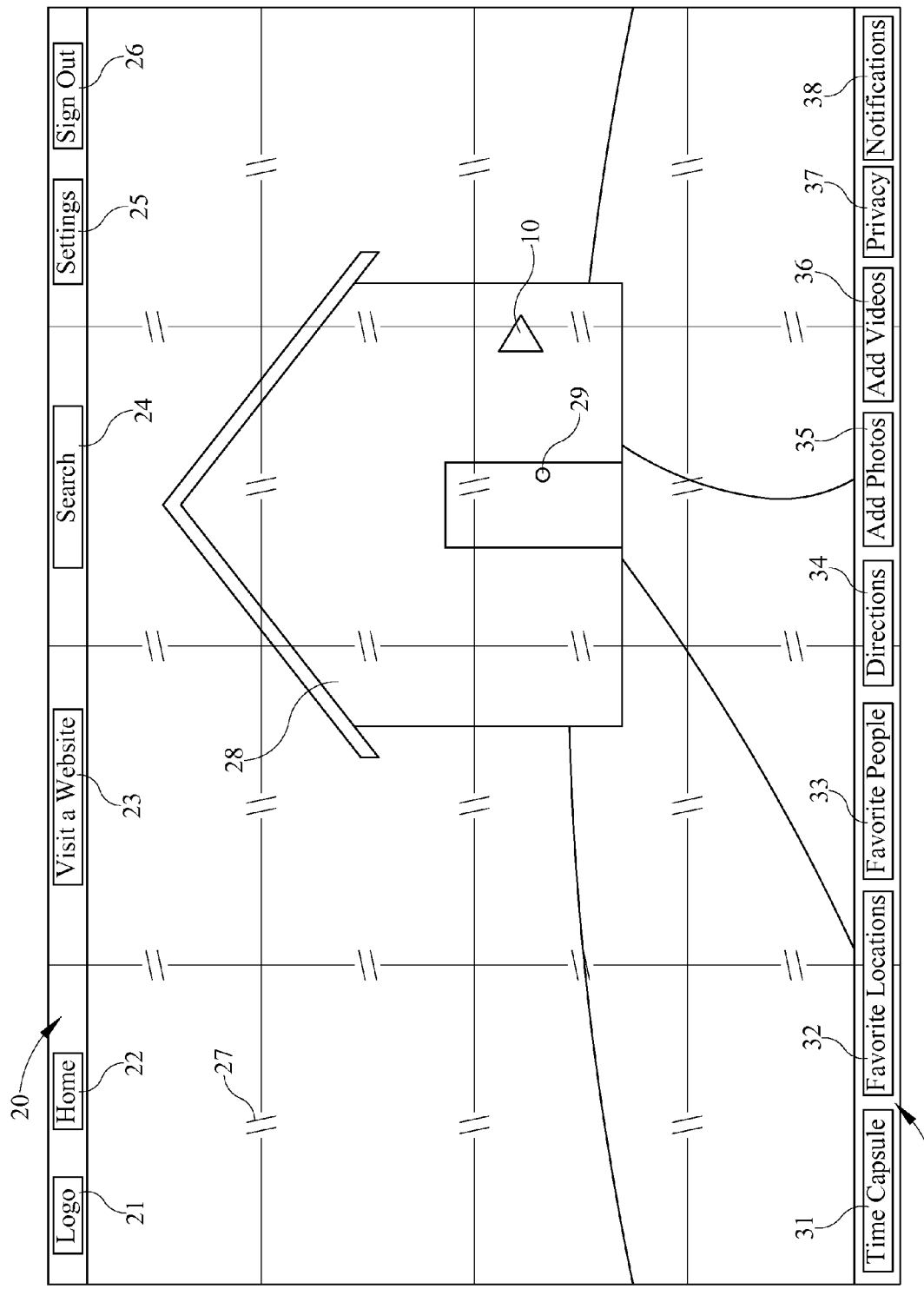
FIG. 1 illustrates an embodiment of a user interface generated by an interactive representative reality system.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the approach disclosed herein are suited for implementation utilizing aspects of one or more known computer programs. Accordingly, for illustrative purposes, the claimed invention may be discussed in conjunction with such programs. However, other configurations and applications that utilize alternative known and/or specially developed computer programs are contemplated without deviating from the scope or spirit of the claimed invention.

The apparatus and methods described herein may provide a representative reality (a digital representation of all or portions of earth) using actual media taken from individual recording devices. Further, such a representative reality may also be interactive, thereby allowing viewers to interface with the objects seen in the representative reality.

The method and apparatus described herein may utilize pictures and/or other media encoded with geotags to place them at the proper location on a representation of all or portions of earth. Pictures or other media may be uploaded via, inter alia, wireless memory cards or networked devices such as cellular phones, portable computers or other devices. Photos from a variety of sources can be integrated into the rendering of all or portions of the earth. Security camera photos, tourist photos, press photos, and other images may all be utilized if desired. As media content is made available to the public domain and/or one or more private domains accessible by the system described herein, such media may be automatically and/or manually incorporated into the representative reality.

Each of the uploaded pictures may be "stitched" together by the system with one or more other pictures to create a digital representation of all or portions of the earth. The photos may optionally be further interpreted and rendered into three dimensional (3D) renderings so that a 3D viewable perspective is created. Photos of a plurality of sides of the same object may be stitched together to form a 3D perspective view. 3D rendering may also optionally allow viewing of a rendered image for perspectives for which no photographs exist. Accordingly, many aspects of the representative reality may be navigable by the user in a three dimensional simulation.

The user may also interact further with objects depicted in the representative reality by selecting an item. For example, objects in the representative reality may be identified and coded and connected via hyperlink or otherwise to related objects, products, and/or information. Therefore, certain objects in the representative reality may be selectable, expandable, and/or otherwise interactive. For example, a user viewing the representative reality may be able to select an automobile depicted therein. Upon selecting the automobile, information about automobiles will be available to the user as well as information on purchasing automobiles. The representative reality created stitching together available images creates an up-to-date and accurate representation of actual places and objects, that is also interactive. Additionally, the representative reality may enable past images and other media to be utilized to thereby view all or aspects of a geographic location at a desired past time.

Referring to FIG. 1, a user interface of an embodiment of an interactive representative reality system is depicted. The user interface includes a top navigational area 20 that includes a logo 21 that may include a graphical logo for the website and also includes a home button 22. The logo 21 and the home button 22 may provide a user selectable link to a user designated or automatically designated home screen. The top navigational area 20 also includes an address text field 23 that may be selected by a user and receive text typed by the user. The address text field 23 may receive a website address and direct the user to the website address within the user interface and/or may optionally receive a physical address and direct the user to the physical address through the user interface. A search text field 24 is also included that may receive one or more search terms and direct the user to one or more search results within the user interface. The search results may optionally include website addresses and/or physical addresses. Also provided on the top navigational area are a settings button 25 and a sign out button 26. The settings button 25 provides a link to a plurality of settings for the user interface and/or other aspects of the system (e.g., preferences regarding user interface appearance, privacy settings, contact settings). The sign out button 26 may be selected by a user to enable the user to log out of the system.

The user interface also includes a bottom navigational area 30 that includes a time capsule button 31, a favorite locations button 32, a favorite people button 33, a directions button 34, an add photos button 35, an add videos button 36, a privacy button 37, and a notifications button 38. The time capsule button 31 may be selected by a user to see photos, videos, and/or other media of a desired area from a desired date range. For example, a user may select the time capsule button 31 to view a page having all past media for one or more desired locations. Also, for example, a user may select the time capsule button 31 to view all or portions of the representative reality of earth during a certain time period (e.g., from five to ten years ago, on a certain previous date, on any of a plurality of certain previous dates). Clicking the time capsule button 31 may display media from certain dates from which a user may select for viewing, may enable a user to search for media within specific date ranges, may play a temporally sequential slideshow of all media, among other functions. Also, clicking the time capsule button 31 may display media from a specific geographic location, within a predetermined distance from the specific location, and/or from different geographic locations that may correspond to a certain object and/or person (e.g., a certain mobile piece of art may be associated with a plurality of locations [e.g., museums, galleries, or outdoor areas], a certain celebrity may be associated with a plurality of locations [e.g., different public appearance locations]). For example, a user may be viewing a certain location and may click on the time capsule button 31 to display all past media related to the location and/or any objects present within the location. Each of the past media locations may be indexed within the system based at least on geotag data, date, and/or time. Each of the objects present within the past media may be indexed within the system based at least on geotag data, date, time, and/or name (or other identifying data).

The favorite locations button 32 link allows a user to visit locations and/or times that they have listed as a favorite. For example, clicking the locations button 32 may display a listing of previously stored locations and/or times that a user has tagged as his/her favorite. The system may index a plurality of locations and/or times with a user to enable retrieval of favorite locations information for a given user. The favorite people button 33 may allow a user to follow one or more other users and to see photos, videos, and/or other media that is tagged to the other users. A user may optionally track one or more other users geographically via geotagged media having the user therein. Optionally, the other users must provide their consent before they may be followed by a particular user. Optionally, the system may distinguish between public media, etc. taken in public places (e.g., by geotag data and/or manual input) and private media and optionally apply different follow settings to the public and private media. Also, the system may distinguish between media that a user marks as willing to share and media the user wishes to keep private. Moreover, the system may distinguish between public personas (e.g., politicians, actors, etc.) and non-public personas within media and optionally apply different follow settings to the public and nonpublic personas. For example, the system may prevent access from private media of public and non-public personas unless consent is provided, but allow access to public media of public personas even without consent. The system may further differentiate and distinguish public and non-public personas within media and enable viewing of the public persona, while blocking out or distorting the non-public persona. The system may index each piece of media based on the one or more categories the media falls under. For example, the system may tag a piece of media as being taken in a public place and having both public and non-public personas therein.

The directions button 34 allows a user to obtain directions between two or more locations inputted by a user. For example, the directions button 34 may provide direction between locations via automobile, plane, train, bike, foot, boat, etc. The directions button 34 may also optionally enable a user to buy related transportation tickets, coins, or other goods or services. For example, the user may be presented with the option to buy airline tickets to the destination and be presented with the option to buy currency for the destination.

The add photos button 35 allows a user to upload photos they took with a camera, cell phone, or other image recording device. The system will store the image and associate the image with a location within the representative reality of the earth. The system may optionally stitch the image with other images stored in the system as described in additional detail herein. The system may additionally associate the image with the user that uploaded the image, may recognize one or more objects and/or individuals within the image and tag such objects and individuals, and/or associate recognized objects and/or individuals with other media, other websites, and/or other data. Similarly, the add videos button 36 allows a user to upload videos they took with a video camera, cell phone, or other video recording device. The system will store the video and associate the video with one or more locations within the representative reality of the earth. The system may additionally associate the video with the user that uploaded the video, may recognize one or more objects and/or individuals within the video and tag such objects and individuals, and/or associate recognized objects and/or individuals with other media, other websites, and/or other data.

The privacy button 37 provides a link that explains the privacy policies of the system. The privacy button 37 also enables a user to set privacy settings for a particular uploaded piece of media, all uploaded media, and/or groups of uploaded media (e.g., all media containing the individual will be provided with a certain privacy setting). The privacy setting for a piece of media may be stored in the system by, for example, including encoded data in the piece of media. The notification button 38 provides a link to notifications regarding the system. For example, notifications regarding new features, updated privacy options, etc. may be given.

Reference is now made to the area in FIG. 1 located between the top navigational area 20 and the lower navigational area 30. Such area in FIG. 1 generally depicts a view of an area within the representative reality to which the user has navigated (e.g., via the search text field 24, the favorite locations 32, or through manually browsing through the representative reality). A plurality of photo stitches 27 are depicted in FIG. 1. The photo stitches 27 generally indicate where one image ends and another image begins. For example, the depicted house 28 and the landscape surrounding the house actually comprises a plurality of individual images that have been stitched together to form a representation of the house and the surrounding landscape. The images utilized to depict the viewable area may be generated by a single user over similar time periods or may alternatively be generated by various users and/or over several distinct time periods. As described in additional detail herein, the system may stitch several images together based on, inter alia, analysis of the content of the image, analysis of the geotag data of the image (including optional angle and/or tilt data that may be present in the geotag data), and/or manual input. The images may be stitched in overlapping fashion, end-to-end fashion, and/or nesting fashion.

A door knob 29 is present on the house 28 and has been recognized by the system as being a door knob. The system has further ascertained that the door knob 29 represents an actuable object that actuates to thereby cause the door to which it is attached to open and close. Accordingly, the system has made the door knob 29 interactive, enabling a user to select the door knob and access additional data regarding the house 28. For example, the system may associate the door knob 29 with images of the inside of the house, thereby enabling a user to view images of the inside of the house 28 after clicking on the door knob 29. Optionally, the system may animate the door, showing it "opening" and providing an interactive image of the interior of the house 28 through the opened door. Also, for example, clicking on the door knob may provide access to additional data such as details on the house 28 (e.g., owner of the house 28, estimated cost of the house 28, sale history of the house 28, sale data if the house 28 is for sale, and/or other properties owned by the owner of the house 28).

The play button 20 represents a video that has been uploaded of the area. For example, the system may recognize that a video has been uploaded of the area, or a geographical location close to the area. The user may select the play button 20 and cause the video to be played on the user interface and/or stored on the device being utilized to access the user interface. For example, the video may be of the interior of the house 28 and/or of areas proximal to but exterior of the house 28.

Figure 2:
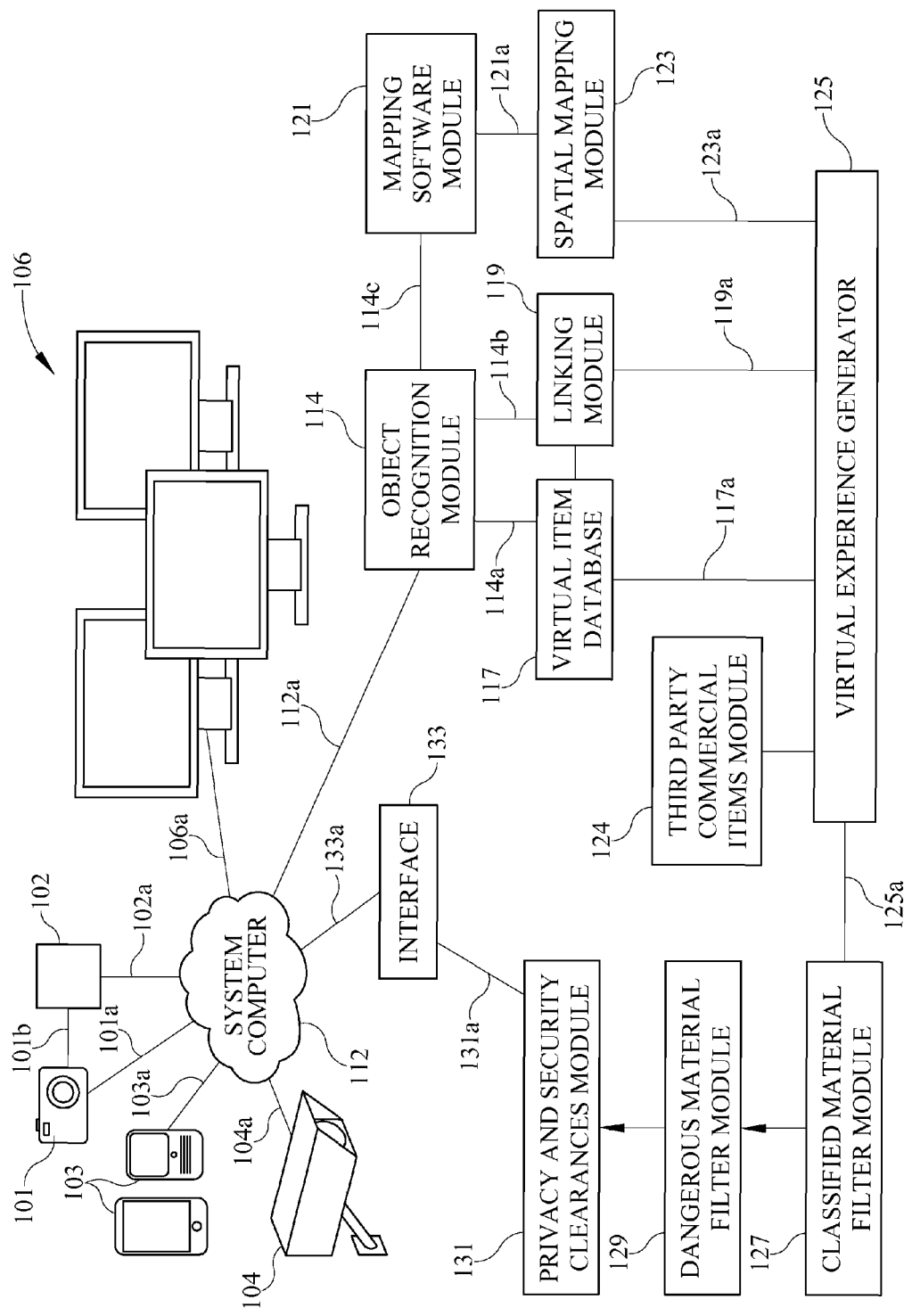
FIG. 2 illustrates a schematic diagram of an embodiment of an interactive representative reality system.

FIG. 2 depicts a schematic diagram of an embodiment of an interactive representative reality system. The system is depicted interfacing with a plurality of recording devices 101-104 and also interfacing with a plurality of end user access computers 106. The system includes at least one system computer 112 encoded with software to perform a plurality of the functions described herein (graphically, textually, or otherwise). In some embodiments the at least one system computer 112 may include a bank of computers 112 that are in communication with one another. A plurality of system modules 114-133 are in communication with the at least one system computer 112. In some embodiments all of the system modules 114-133 may be provided encoded in software on the at least one system computer 112. In other embodiments one or more of the system modules 114-133 may be provided encoded on one or more separate computers.

The recording devices 101-104 include a camera 101 (e.g., a digital camera), a data storage device 102 (e.g., a SD card, XD card, hard drive, CD, DVD, or other type of storage device), a personal device that includes a camera 103 (e.g., a cellular phone or an organizer), and a video recording device 104 (e.g., a surveillance camera, personal video camera, and a personal device that includes a video recorder). A data link 101a is shown between the camera 101 and the system computer 112. The data link 101a may comprise wired and/or wireless connections and enables the transfer of media data between the camera 101 and the system computer 112. For example, the data link 101a may comprise a selective wireless link between the camera 101 and the internet and a wired link between the system computer 112 and the internet. A data link 101b is also shown between the camera 101 and the data storage device 102. Media may be transferred to the data storage device 102 from the camera 101 via data link 101b and the storage device 102 may then transfer the media to the system computer 112 via data link 102a. Similarly, data link 103a is present between the personal devices 103 and the system computer 112 and data link 104a is present between the video recording device 104 and the system computer 112. The data links 101a, 101b, 102a, 103a, and/or 104a may be unidirectional or bidirectional. For example, in some embodiments the data link 101a may only be unidirectional and the data link 103a may be bidirectional. For example, the personal devices 103 may upload media to the system computer 112 and may also optionally view a representative reality supplied by the system computer 112 and/or download selective media and other data from the system computer 112. It will be understood that other recording devices and/or media storage devices may be utilized to upload media to the at least one system computer 112 and that such devices may optionally simultaneously upload the media to the at least one system computer 112.

The end user access computers 106 may be personal computers (e.g., laptop, desktop, gaming console), personal devices (e.g., cell phone, tablet computers), and/or other computer based devices. A data link 106a is provided between the end user access computers 106 and the system computer 112. The data link 106a may be bidirectional and enable a user to, inter alia, upload media from the end user access computers 106 to the system computer 112, view a representative reality supplied by the system computer 112, and/or download selective media and other data from the system computer 112. Media may be uploaded to the end user access computers 106 from one or more separate recording devices such as recording devices 101-104 and/or recording devices integrated into the end user access computers 106 (e.g., an integral webcam).

The system 112 is in communication with an object recognition module 114 via data link 112a. The object recognition module 114 analyzes uploaded media for its content. For example, the object recognition module 114 recognizes and tags objects that are present within media such as, for example, the door handle 29 of FIG. 1. Such objects may be recognized via image analysis, video analysis, and/or sound analysis. Recognized and tagged objects may then be linked by the system 112 for potentially specialized uses. For example, the door handle 29 of FIG. 1 may be linked to media of the interior of the house 28 and may be linked to make the door of the house 28 open when the door handle 29 is selected by a user. The object recognition module 114 is in communication with a virtual item database 117 via data link 114a. The virtual item database 117 is a management system for physical recognizable items in media of the representative reality. The virtual item database 117 includes items that may be recognized by the object recognition module 114 and links recognized items with locations in specific media. The virtual item database 117 may be compiled from user input, third party company product databases, and/or other databases. Items that may be included in the virtual item database 117 include, for example, commercially available items (e.g., cars, soft drinks, real estate, clothing), personas (e.g., people or characters), and/or animals. Additional items may of course be included as described in additional detail herein.

In some embodiments a recognized object within media may be replaced by the object recognition module 114 with a virtual model of the object from the virtual item database 117. The virtual item database 117 may include, for example, stock images, stock 3D models, and/or stock animations of certain objects that may replace such objects in media. For example, the object recognition module 114 may recognize a certain brand of computer in a picture. The object recognition module 114 may replace the computer in the picture with a virtual model of that brand of computer that enables the user to interact with the computer. For example, the user may view the computer from all angles and/or may view the interior components of the computer.

In some embodiments software such as, for example, GOOGLE GOGGLES® may be utilized, in whole or in part, to recognize one or more objects within media. GOOGLE GOGGLES® may analyze user uploaded media and distinguish content within the media based on other media and/or data related to similar objects. For example, a beverage can within an image may be recognized as a beverage can, a specific brand of beverage, and/or a certain size of beverage based on other images of the beverage can that have been uploaded by other users and/or supplied by a company and identified as such. Objects that are not recognized as an item present in the virtual item database 117 may be filtered through to one or more separate databases for future recognition or other uses. For example, unrecognized objects may be filtered to a separate database and compared with other unrecognized objects to determine if they are similar to other unrecognized objects present within media. The system 112 may identify objects that are prevalent within various media, but not included in the virtual item database 117. The system 112 may tag such objects for future manual or automatic recognition and inclusion in the virtual item database 117.

The linking module 119 is in communication with the object recognition module 114 and the virtual item database 117 via respective of data links 114b and 117b. The linking module 119 links recognized objects to inter alia, websites related to the objects; other media within the representative reality that contain similar objects; people, places, items, and/or other information that are subjectively and/or objectively similar to the identified objects. For example, the linking module may tag a recognized object within media to link it with other media within the representative reality that contains a similar object, other media within the representative reality that is associated with the object (e.g., media related to a location where the object was manufactured, is sold, or was previously located).

The object recognition module 114 is also in communication with a mapping software module 121 via data link 114c, thereby enabling data related to media that has been recognized by the object recognition module 114 to be sent to the mapping software module 121. The mapping software module 121 may compare media that is newly received from object recognition module 114 to existing media from a database of previously received media having a geographic location to thereby identify existing media that is similar to the newly received media. Through such a comparison, the mapping software module 121 may further associate newly received media with a geographic location even if the newly received media does not have geodata associated therewith. For example, the mapping software module 121 may compare an image of the Eiffel tower with previously received images of the Eiffel tower and determine that the newly received media was taken in a geographic location proximal to the Eiffel tower. Moreover, the mapping software module 121 may optionally use additional information to further narrow the geographic location. For example, the mapping software module 121 may analyze zoom data from the image to determine approximately how far back a user was when taking the picture; may analyze other objects in the media to determine approximately how far back and at what direction the recording device was when taking the picture; and/or may compare the image to previous geotagged images taken at various distances and directions to identify approximately how far back and at what direction the recording device was when taking the picture.

The mapping software module 121 is in communication with spatial mapping module 123 via data link 121a. The mapping software module 121 transmits media that has been associated with a geographic location (via geodata or otherwise). The spatial mapping module 123 then analyzes the media and determines the physical size of the object(s) in the media provided. For example, the spatial mapping module 123 may distinguish between a zoomed-in picture of a single flower taken at a given geographic location and a wide angle picture of a garden that contains that flower taken at the same geographic location. Accordingly, as described herein, the wide angle picture of the garden may be displayed initially in the virtual representation with the option for a user to view more detailed images of the garden (e.g., images of a single flower in the garden). Also, as described herein, images may be resized to be appropriately sized relative to other images. For example, the image of the flower may be resized to be stitched within and fit appropriately within the image of the garden. The spatial mapping module 123 may utilize, inter alia, object recognition data, zoom meta data, lens data, image comparison analysis, and/or user input to determine the physical size of object(s) in provided media.

The spatial mapping module 123 may also optionally include a temporal mapping component. The temporal mapping component may analyze the media and determine the exact or proximate date the media was recorded. For example, the temporal mapping component may analyze time data tagged with the media to determine when the media was recorded. Also, for example, the temporal mapping component may compare the media to other media of the geographic location that is of a known time period to determine approximately during what time period the media was taken. The spatial mapping module 123 may then tag or group the media by specific date and/or date range.

A virtual experience generator 125 is in communication with the virtual item database 117, the linking module 119, the spatial mapping software 123, and third party commercial items module 124 via respective of data links 117a, 119a, 123a, and 124a. The third party commercial items module 124 provides media of commercial items that may optionally be implemented into the representative reality. For example, one or more images of vehicles that are for sale may be implemented into the representative reality and viewable when a user navigates to one or more predetermined car dealerships. For example, a car dealership may choose to provide pictures of cars that are currently for sale that will be accessible by a user when the user visits the car dealership's geographic location in the representative reality. Optionally, the pictures of cars may be interlaid on the representative reality such as, for example, placed in the parking lot of the car dealership. The pictures of cars may each be linked to additional information concerning the car such as, for example, price, condition, and/or a website allowing a user to purchase the car. Also, for example, a car dealership may choose to provide pictures of cars that are currently for sale that will be accessible by a user when the user visits a competing car dealership's geographic location in the representative reality.

The virtual experience generator 125 combines data received from the virtual item database 117, the linking module 119, the spatial mapping software 123, and/or the third party commercial items module 124 to create an interactive, three-dimensional representative reality for end users to experience through an end user access device. The virtual experience generator 125 will "stitch" together a plurality of photographs to form at least portions of the representative reality. For example, a photograph of the top of the Eiffel Tower may be electronically stitched with photographs of the bottom half of the Eiffel Tower to create the illusion of a complete picture. Stitching may optionally take place across multiple visual angles and aspects of the same object, to thereby create at least partially three-dimensional views of at least some aspects of the representative reality. For example, a plurality of photographs from a plurality of different visual angles and aspects may be stitched together to enable a user to view the Eiffel Tower at multiple orientations. With a sufficient quantity of media, the virtual experience generator 125 may compile what is in essence a three-dimensional environment that substantially mimics one or more areas of earth.

In some embodiments software such as, for example, 3D STUDIO MAX® and/or CINEMA 4D® may be utilized, in whole or in part, to create the representative reality in the virtual experience generator 125. Such software allows developers to create immense worlds of color, light, and realism based on simple vectors and three dimensional shapes that create "walls". These bare colorless "walls" can be wrapped in images, textures and more to create a realistic 3D environment. Photographs that are uploaded by a user may be analyzed for placement by inter alia, geodata indicating where the photo was taken, the timestamp indicating when the photo was taken, and/or tilt and/or angle information present in the geodata that may provide perspective to the photo in relation to other photographs and objects.

The photo will then be placed on the necessary "wall" as created by the 3D imaging software, and then stitched together with other photos in close proximity. It will give the "wall" something to display, and will take on the intended 3D environment. Places in the 3D environment that do not have uploaded images associated therewith may optionally use placeholder images such as, for example, images available from GOOGLE EARTH® until users upload appropriate photos that may replace the placeholder images. Other photo stitching technology may be utilized or developed such as, for example, open source photo stitching technology that may be tailored for this particular application. Aspects of the virtual experience generator 125 may be automated, thereby requiring minimal human interaction to create a representative reality of the environment while other aspects may require some degree of human interaction to appropriately place and/or stitch images.

The virtual experience generator 125 may also link video, sound, other images, and/or other specialized content to certain areas in the representative reality. For example, a user may be able to select video recorded of, or proximal to, the area being viewed in the representative reality. The video may be accessible via, for example, a play button that appears atop the area being viewed and/or a video selection button in a toolbar bordering the image being viewed.

The virtual experience generator 125 may utilize temporal data associated with images to only stitch together photographs from a similar time period when forming some or all of the representative reality. For example, only photographs of the Eiffel Tower taken within the last year may be utilized in forming a "current" representative reality. Optionally, the virtual experience generator 125 may choose to utilize only the most current photographs in creating the representative reality. In some other embodiments the virtual experience generator 125 may take into account the date of the photograph in addition to one or more other features of the photograph such as, for example, the quality of the photograph and/or the source of the photograph. Also, for example, only photographs of the Eiffel Tower taken during 2001 may be utilized in forming a "past" representative reality of the Eiffel Tower as it appeared in 2001. Accordingly, the virtual experience generator 125 may create a representative reality from one or more desired time periods via analysis of temporal data associated with the images.

Temporal data associated with video, sound, and/or other specialized content that is linked with certain geographical locations in the representative reality may also be utilized to only link and/or display content from a certain time period as well. For example, a user may be able to choose to view only additional linked content (e.g., video, sound) from 2001 when viewing a representative reality of the Eiffel Tower as it appeared in 2001. Also, the virtual experience generator 125 may also link past images in the representative reality. For example, the virtual experience generator may enable a user to view past images of an area while the user is viewing the area in the representative reality. For example, a user may choose to view images within a certain date range, from a certain date, before a certain date, and/or after a certain date that were taken of a specific geographic location and/or proximal to a specific geographic location.

The virtual experience generator 125 may make one or more objects recognized by the object recognition machine 114 interactive. For example, the virtual experience generator 125 may make an object within the representative reality clickable and upon clicking by a user may display one or more items related to such object by the linking module 119. For example, when an object is clicked, links of websites related to the object, other media within the representative reality, and/or other related information may be provided to the user. Also, for example, the virtual experience generator 125 may make an object within the representative reality movable and, upon clicking by a user, may move the object. For example, a door to a house within the representative reality may be clickable and, upon clicking, the door may open. The virtual experience generator 125 may link the clicking of the door to images within the house, information about the house, may display images of the interior of the house through the open door, etc.

Prior to being accessed by end users, all or aspects of the representative reality developed by the virtual experience generator 125 may be processed through a classified material filter module 127. The classified material filter module 127 may remove and/or block access to material that is deemed to be classified by a government or other institution. For example, media having geodata indicating creation within a classified area may be removed and/or blocked. Optionally, such material may be blocked from only a certain group of users (e.g., those not having an appropriate security clearance). One of ordinary skill in the art, having had the benefit of the instant disclosure, will recognize and appreciate that in alternative embodiments the classified material filter module 127 may be implemented upstream of the virtual experience generator 125 to thereby remove classified media prior to compilation in the virtual experience generator 125.

Prior to being accessed by end users, all or aspects of the representative reality developed by the virtual experience generator 125 product may be processed through a dangerous material filter module 129. The dangerous material filter module 129 may remove and/or block access to material that is deemed to be inappropriate. For example, media containing nudity, violence, and/or other graphic material (as recognized by the object recognition module 114, flagged by a user, or otherwise recognized) may be removed and/or blocked. Optionally, such material may be blocked from only a certain group of users (e.g., minors or adults choosing not to see graphic material). One of ordinary skill in the art, having had the benefit of the instant disclosure, will recognize and appreciate that in alternative embodiments the dangerous material filter module 129 may be implemented upstream of the virtual experience generator 125 to thereby remove dangerous media prior to compilation in the virtual experience generator 125.

Prior to being accessed by end users, all or aspects of the representative reality developed by the virtual experience generator 125 product may be processed through a privacy and security clearances module 131. The privacy and security clearances module 131 may remove and/or block access to material that is designated by a user who uploaded the material (or another user who may alter rights to the material) as being restricted access material. For example, a user may want to prevent any other users from seeing material that is uploaded and the privacy and security clearances module 131 may block all access to such material. Also, for example, a user may want to only allow close friends to view certain material that is uploaded and the privacy and security clearances module 131 may tag such material for viewing only by such close friends. Also, for example, a user may upload certain material as classified and the privacy and security clearances module 131 may tag such material for viewing only by those having appropriate clearance to view such material. For example, a user may allow select individuals to view all media uploaded by that user; may allow select individuals to view images taken in certain areas (e.g., businesses and/or public areas), but not in certain areas (e.g., homes and/or other private areas); and/or may allow select individuals to track the location of images containing the user's face, thereby enabling select individuals to track the geographic movements of a user.

In some embodiments some or all aspects of the privacy and security clearances module 131 may be linked with a user's settings in a social networking application. For example, the amount of access given to an individual in a social networking application will correlate with the amount of media of a user that individual person may view. For example, non-friends in a social networking application may not be allowed to view any media of a user, or may only be allowed to view media of a user that does not include any people and that is taken in a public place. Also, for example, friends in a social networking application may be allowed to view all media of a user, except media that is marked private by a user.

The filtered and tagged representative reality is provided to an interface module 133 via data link 131a. The interface module 133 compiles the data into an end user accessible format. For example, the interface module 133 may compile the data into a format that is accessible by a user via a web browser and, optionally, one or more plug-ins. Also, for example, the interface module 133 may additionally or alternatively compile the data into a format that is accessible by a user from within a standalone application and/or a separate application. The interface module 133 may also optionally integrate appropriate buttons, text fields, menu options, and other user interface tools to enable navigation and utilization of various aspects of the representative reality.

The interface module 133 is in communication with the system computer 112 via data link 133a. The system computer 112 hosts and serves the interface and representative reality to devices of end users such as, for example, computers 106. The system computer 112 may communicate with computers 106 or other devices using one or more protocols such as, for example, TCP/IP. As described herein, the system computer 112 may optionally incorporate one or more of the modules 114-133 therein and may be encoded with software to perform a plurality of the functions described herein (graphically, textually, or otherwise). In some embodiments the at least one system computer 112 may include a bank of computers 112 that are in communication with one another.

Figure 3:
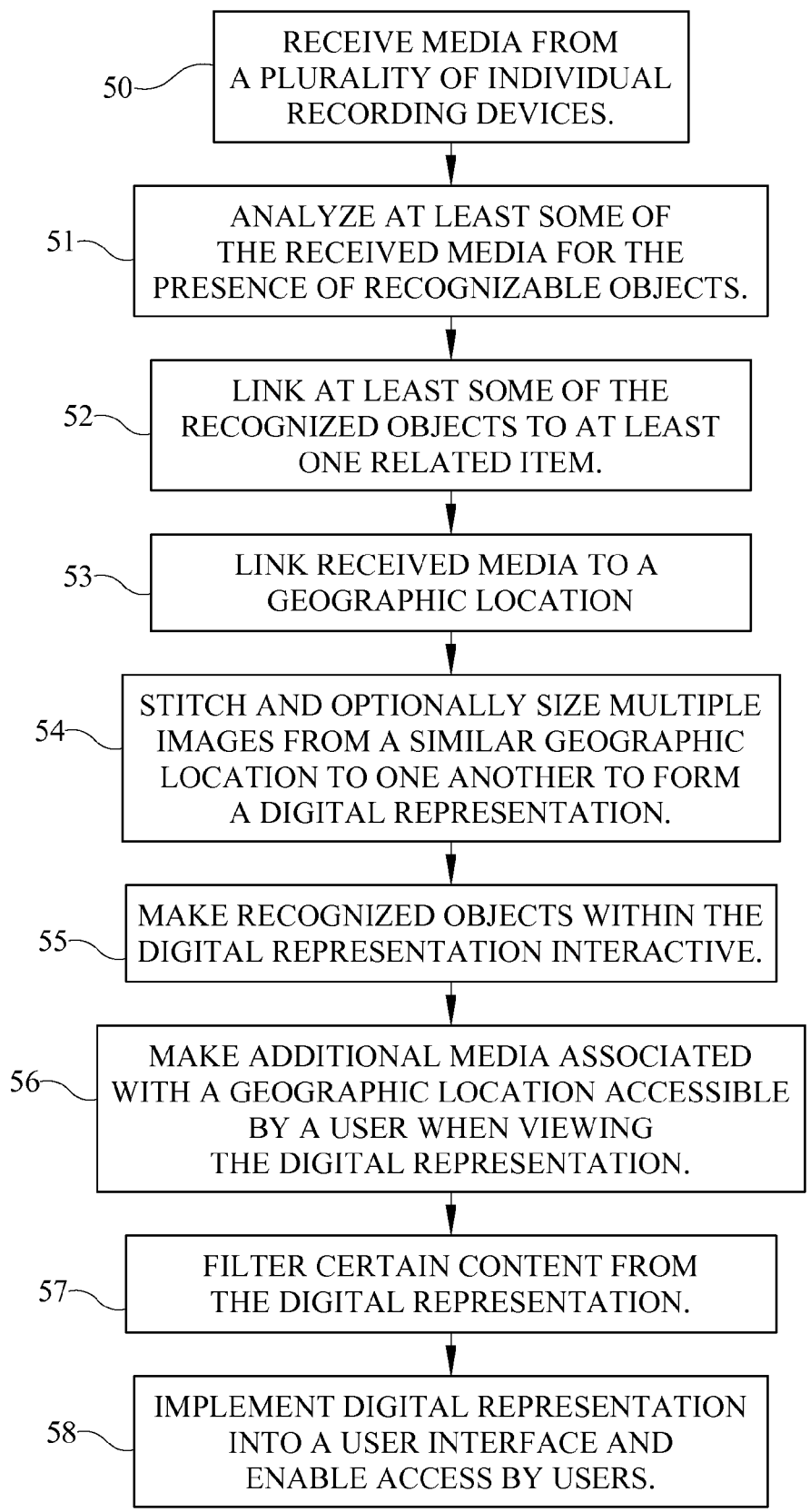
FIG. 3 illustrates a flowchart of an embodiment of a method of creating an interactive representative reality.

Referring now to FIG. 3, a flowchart of an embodiment of a method of creating an interactive representative reality system is shown. Certain steps of the embodiment of the method of creating an interactive representative reality system are shown in additional detail in FIGS. 4 through 9. At step 50 media is received form a plurality of individual recording devices. The recording devices may be, for example, any of the recording devices described herein and the media may include, for example, images, video, and/or sound. The media may be received from a plurality of individual users and/or sources and may comprise media taken at distinct times and taken at distinct geographic locations. The media may be transferred substantially in real time as taken or may be uploaded to the device at a later time. Media may be received from, for example, security cameras, personal cameras, cell phones, and/or image databases such as commercial image databases. Access to commercial image databases may be accomplished via license agreements and/or cooperative agreements.

Figure 4:
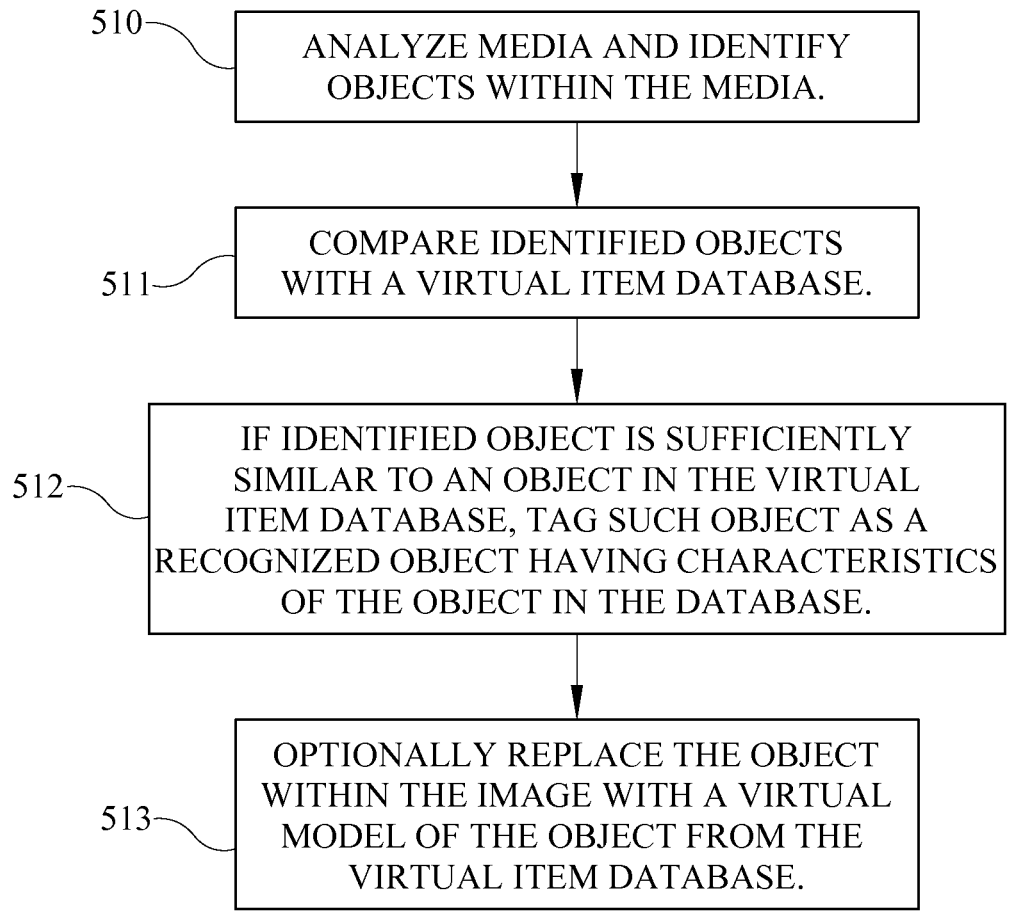
FIG. 4 illustrates a flowchart of an embodiment of the analysis for the presence of recognizable objects in the embodiment of a method of creating an interactive representative reality of FIG. 3.

At step 51 at least some of the received media is analyzed for the presence of recognizable objects. Referring briefly to FIG. 4, a flowchart showing an embodiment of the analysis for the presence of recognizable objects is shown in additional detail. At step 510 media is analyzed to identify objects within the media. In some embodiments an open source program may be utilized to identify objects within the media. In other embodiments GOOGLE GOGGLES® may additionally or alternatively be utilized. Recognized objects may include, inter alia, faces, people, animals, and other tangible things. Optionally, facial recognition software may be implemented to recognize not only the presence of a person, but one or more identifying features of a person. At step 511 identified objects are compared with a virtual item database. At step 512 if the identified object is sufficiently similar to an object in the virtual item database, the object is tagged as a recognized object having characteristics of the object in the database. For example, if the object is a certain model and year of car present in the virtual item database, the object may be tagged as such. In some embodiments the virtual item database may include one or more people that may be recognized via features identified by facial recognition software. For example, the virtual item database may include a listing of facial features of fugitives and recognized faces in the media may be analyzed by facial recognition software then compared to the database of fugitives to identify a potential fugitive. Such information may optionally be beneficially used by law enforcement agencies to locate and track individuals. Optionally, such tracking of individuals may be restricted to images having geographic data indicating that such images were taken in a public location. At step 513 the object within the image is optionally replaced with a virtual model of the object from the virtual item database. For example, the object within the image may be replaced with a higher resolution image, or may be replaced with a 3D model of the object that is interactive to allow more detailed viewing of the object. If an identified object is not sufficiently similar to an object in the virtual item database it may optionally be tagged for later analysis by one or more users and/or one or more additional algorithms and/or databases.

Referring again to FIG. 3, at step 52 at least some of the objects that were recognized in step 51 are linked to at least one related item. In some embodiments the objects may be linked to inter alia, websites related to the objects; other media within the representative reality that contain similar objects; people, places, items, and/or other information that are subjectively and/or objectively similar to the identified objects. For example, a DVD movie may be linked with a trailer for the DVD. In some embodiments the objects may be linked to a related item by tagging the objects with data pertaining to the related item. In some embodiments a plurality of objects may be automatically tagged by a computer based on identity of the objects and previous tags related to such objects. In some embodiments the objects may additionally or alternatively be manually tagged by one or more users.

Figure 5:
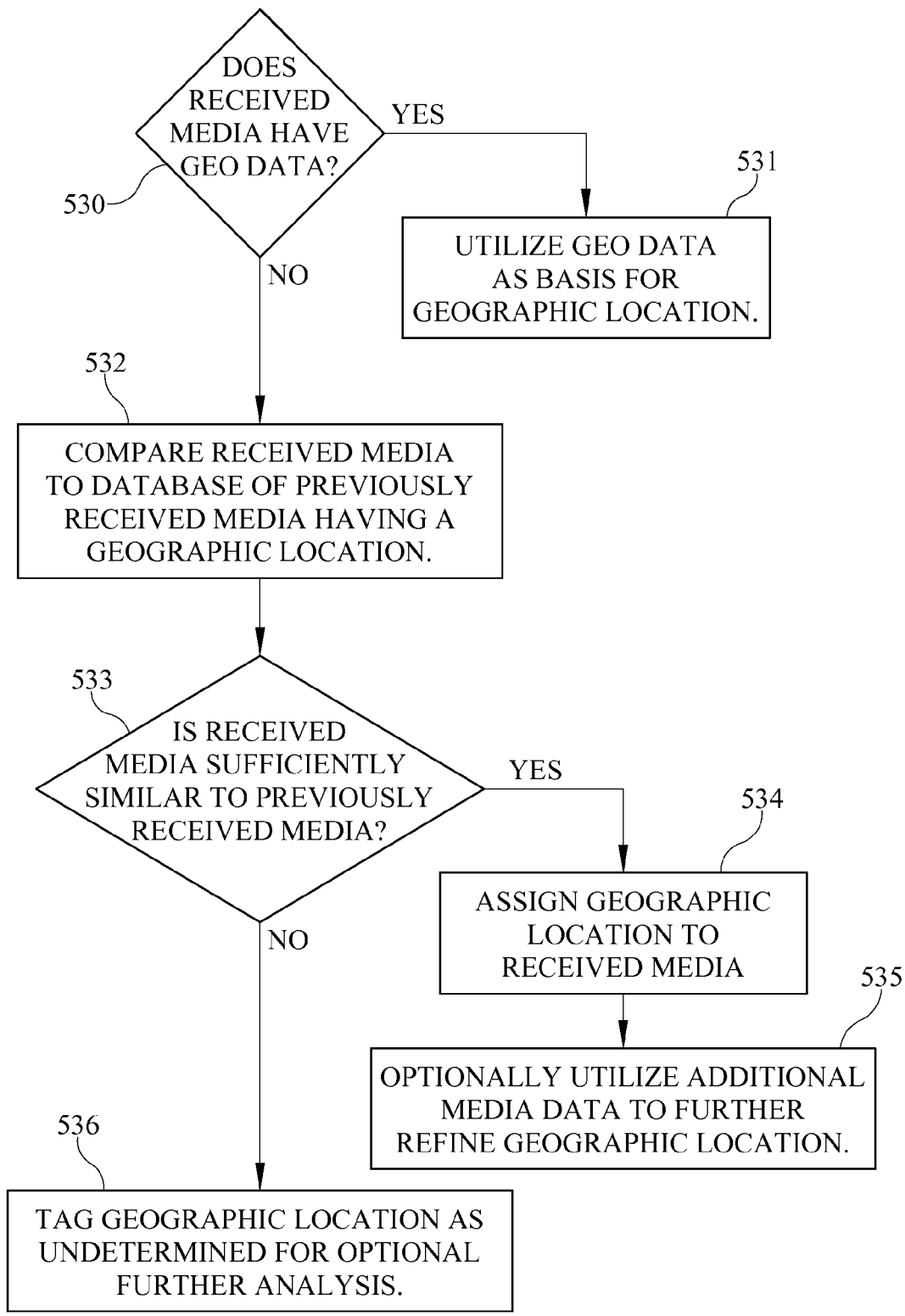
FIG. 5 illustrates a flowchart of an embodiment of the linking of the media to a geographic location in the embodiment of a method of creating an interactive representative reality of FIG. 3.

At step 53 the received media is linked to a geographic location. Referring briefly to FIG. 5, a flowchart showing an embodiment of the linking of the media to a geographic location is shown in additional detail. At step 530 the media is analyzed to determine if it has geodata. If it does, at step 531 the geodata is used as a basis for the geographic location. Optionally, the geodata may be verified and/or refined using one or more of the methodologies described herein and/or through user input. If the media does not have geodata, then at step 532 the received media is compared to media within a database of existing media that has a geographic location. For example, a plurality of objects may be identified in the received media and compared with any received media that has a geographic location that has the same or similar plurality of objects arranged in the same and/or similar fashion. For example, a specific drugstore sign may be identified in a received image, along with a specific street sign. Such data may be compared to existing media to locate other media, or group of media, that has a geographic location and includes both the drug store sign and the specific street sign in close proximity. At step 533 it is determined whether the received media is sufficiently similar to the located existing media that has a geographic location. For example, it may be determined whether the identified drug store sign and the specific street sign are in approximately the same spatial relationship in the received media as they are in the existing media that has a geographic location.

If the received media is sufficiently similar to the located existing media that has a geographic location, then at step 534 a geographic location is assigned to the received media. In some embodiments the assigned geographic location may be exactly the same as the geographic location of a single piece of existing media and/or an average geographic location of a plurality of media. At step 535 additional media data may be utilized to further refine the geographic location. For example, zoom data from the image may be analyzed to determine approximately how far back a user was when taking the media; other objects in the media may be analyzed to determine approximately how far back and at what direction the recording device was when recording the media; and/or the media may be compared to previous geotagged media taken at various distances and directions to identify approximately how far back and at what direction the recording device was when recording the media. If the received media is not sufficiently similar to the located existing media that has a geographic location, then at step 536 the received media is tagged as having an undetermined geographic location. Optionally, further computer and/or user analysis may be performed to determine the geographic location of the received media.

Figure 6:
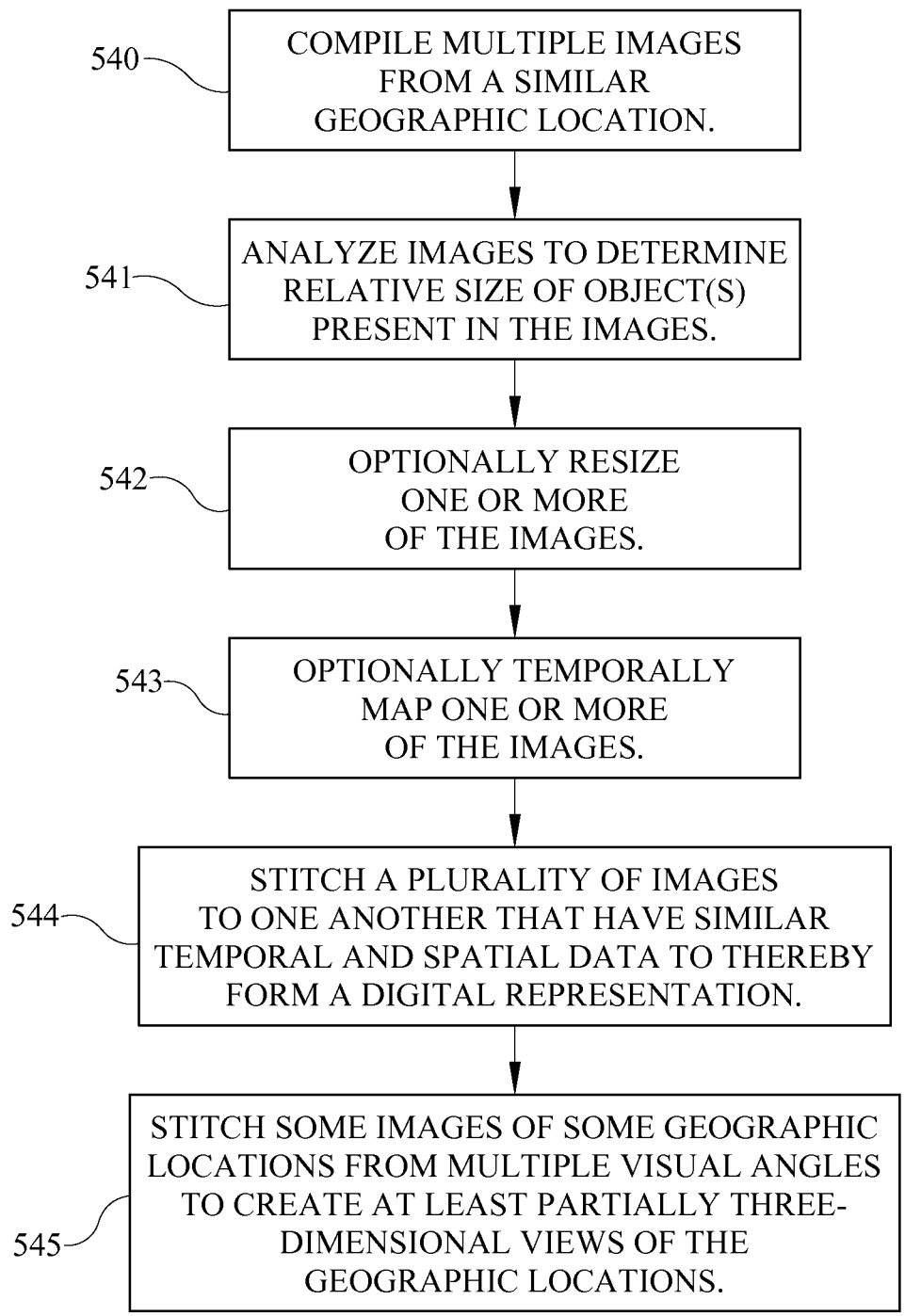
FIG. 6 illustrates a flowchart of an embodiment of the stitching of multiple images from a similar geographic location and optional sizing of those images in the embodiment of a method of creating an interactive representative reality of FIG. 3.

Referring again to FIG. 3, at step 54, multiple images from a similar geographic location are stitched to one another to form a representative reality and are optionally sized relative to one another. Referring briefly to FIG. 6, a flowchart showing an embodiment of the stitching of multiple images from a similar geographic location and optional sizing of those images is shown in additional detail. At step 540 multiple images from a similar geographic location are compiled together. At step 541 those images are analyzed to determine the relative size of object(s) that are present in the images. For example, objects that are recognized objects within the virtual item database may have approximate size data associated therewith, enabling recognition of the approximate size of the objects within the image. Also, for example, image data such as the lens being utilized, zoom level, etc. may additionally or alternatively be analyzed to determine approximate size of the objects within the image. At step 542, one or more of the group of images may be resized so that the images are approximately appropriately sized relative to one another. The images may be resized based upon, for example, the size of objects therein as determined at step 541 and/or comparison of an image to one or more similarly geographically located images. The images may also be cropped and otherwise manipulated (e.g., manipulation of brightness, color, contrast, quality, etc.) as desired to enable consistency among multiple stitched images, to enable a more efficient and/or more aesthetically pleasing stitching of images, and/or to conform to one or more defined image settings. At step 543 one or more of the images may optionally be temporally mapped. For example, the images may be temporally mapped based on image data regarding the date recorded and/or based on comparison of the images to existing images of a similar geographic area at known times. At step 544 a plurality of the optionally resized images having similar temporal and spatial data are stitched to one another to thereby form a portion of a representative reality. The images may be stitched end-to-end, overlapped, and/or embedded with other images. At step 545 some images of some geographic locations are stitched from multiple visual angles to create at least partially three-dimensional views of such geographic locations. For example, a plurality of photographs from a plurality of different visual angles and aspects may be stitched together to enable a user to view one or more objects within a geographic location at multiple orientations. The images may be manually and/or automatically placed and, as described herein, may optionally be placed utilizing software such as 3D STUDIO MAX® and/or CINEMA 4D®.

Figure 7:
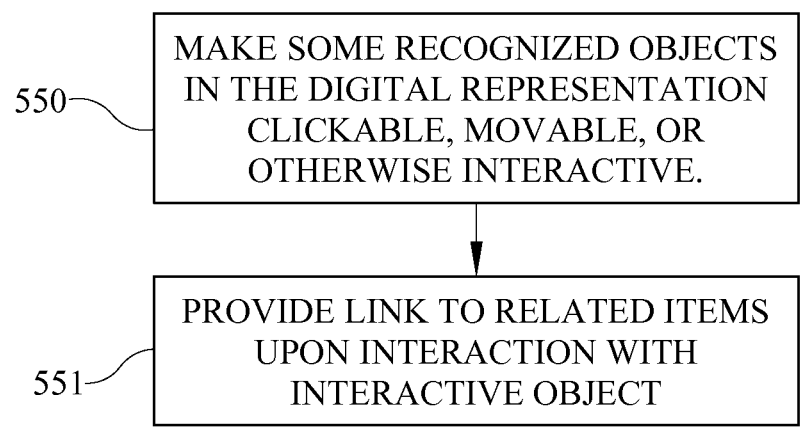
FIG. 7 illustrates a flowchart of an embodiment of making recognized objects interactive in the embodiment of a method of creating an interactive representative reality of FIG. 3.

Referring again to FIG. 3, at step 55, at least some recognized objects within the representative reality are made interactive. Referring briefly to FIG. 7, a flowchart showing an embodiment of making recognized objects interactive is shown in additional detail. At step 550 at least some of the recognized objects in the representative reality are made clickable, movable, selectively animated, or otherwise interactive. For example, an object may be made selectively animated and may be programmed to animate after clicking of the object by a user. At step 551 a link to related items may optionally be programmed to occur upon interaction with the interactive object. For example, upon the clicking of an object, to display information related to a related item identified in step 52 may be displayed to the user.

Figure 8:
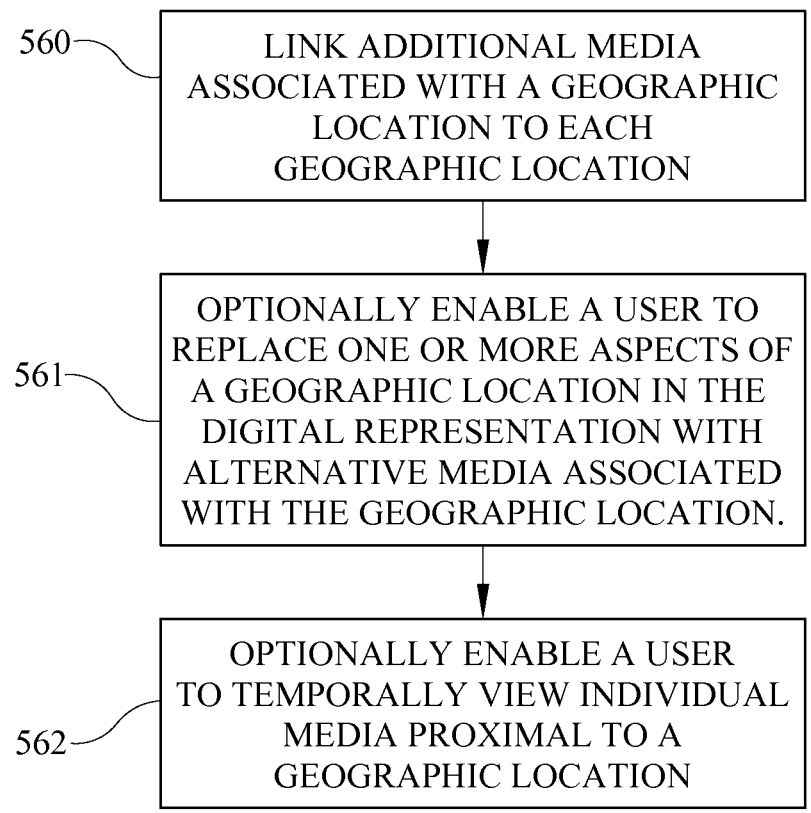
FIG. 8 illustrates a flowchart of an embodiment of making additional media associated with a geographic location accessible by a user in the embodiment of a method of creating an interactive representative reality of FIG. 3.

Referring again to FIG. 3, at step 56, at least some additional media associated with a geographic location is made accessible by a user when the user is viewing the representative reality. Referring briefly to FIG. 8, a flowchart showing an embodiment of making additional media associated with a geographic location accessible by a user is shown in additional detail. At step 560 additional media associated with a geographic location is linked to such location. In some embodiments only additional media having a similar geographic location may be linked to such location. In other embodiments additional media having a non-geographic relationship to such location may additionally be linked to such location. For example, additional media of a person or thing that was present at a location may be linked to such location. At step 561 a user may be enabled to replace one or more aspects of a geographic location in the representative reality with alternative media associated with the geographic location. For example, if a user desires to see a location as it existed ten years ago, the user may replace the current view of the geographic location with a view compiled from images that are approximately ten years old. Also, for example, if a user desires to see one building in a group of buildings as it was ten years ago, the user may replace the current view of such building with one or more images of such building that are approximately ten years old. At step 562 a user may optionally view individual media that is linked to a geographic location in step 560. For example, a user may choose to view all media that is within a two hundred foot radius of a given location and that was created within the last year.

Figure 9:
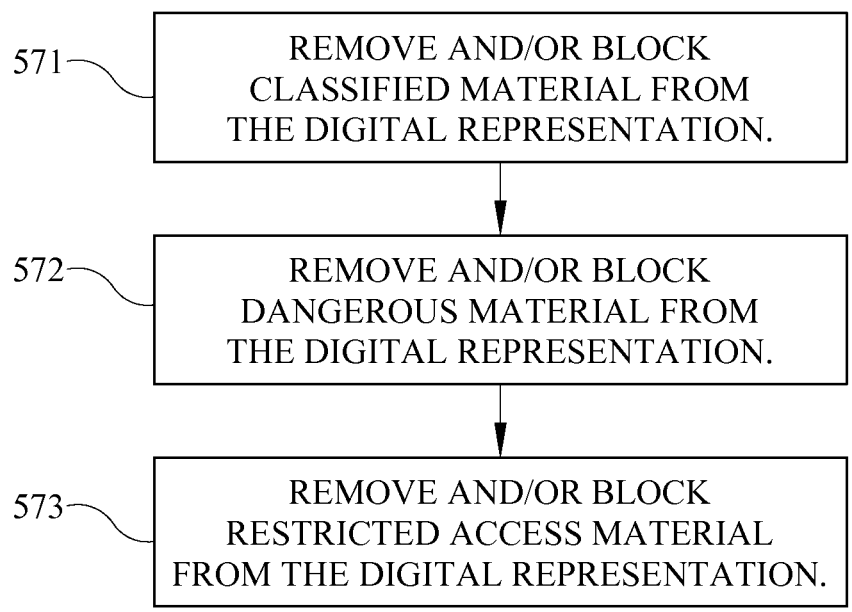
FIG. 9 illustrates a flowchart of an embodiment of filtering content from the digital representation in the embodiment of a method of creating an interactive representative reality of FIG. 3.

Referring again to FIG. 3, at step 57 certain content may be filtered from the representative reality. Referring briefly to FIG. 9, a flowchart showing an filtering content from the representative reality is shown in additional detail. At step 571 any material that is potentially classified may be removed and/or blocked from the representative reality. For example, material that has been tagged as classified and/or material that has geodata from a classified area may be removed and/or blocked from the representative reality. At step 572 any material that is potentially dangerous may be removed and/or blocked from the representative reality. For example, material that has been tagged as dangerous and/or material that has been analyzed and determined to contain potentially dangerous aspects may be removed and/or blocked from the representative reality. At step 573 any material that is potentially restricted may be removed and/or blocked from the representative reality. For example, material that has been tagged by a user as private or semi-private by a user may only be viewable by those individuals designated by such a user. Optionally, in determining which individuals may view a user's private or semi-private media, a user's social networking application may be consulted. Also, optionally, other data may be consulted in determining which media of an individual to mark as restricted. For example, a user may use a webcam and "scan" in the bar code on the back of their driver's license. By doing this, the user's details may be located in the national drivers license database, the user's personal information (name, address, etc.) may be verified, and certain areas the user deems "theirs" may be restricted. For example, if the user lives at 123 Sunny Street, and their ID confirms it, then the user can deny access of all or select users to that address. This prevents people from virtually coming into a user's residence (e.g., viewing media taken with a user's residence) without the user's permission. Any object or building that is deemed a "home" by object recognition software and/or or by means of the address being listed as such, may be automatically listed as private and off limits unless the user opens the settings to allow one or more other people to view within the home. In other embodiments other identification techniques may be utilized in addition to or as an alternative to a license such as, for example, facial recognition technology and/or fingerprint technology.

Referring again to FIG. 3, at step 58 the representative reality is implemented into a user interface and access to the representative reality by users is enabled. The user interface may include proper coding to allow access by a browser or other computer application, to provide aesthetic improvements to the representative reality, and/or functional aspects thereto (e.g., menu buttons, navigation buttons, etc.). Users may access the representative reality over the internet in some embodiments. In some embodiments all or aspects of the representative reality may be restricted to a closed network. For example, a governmental agency may desire to create a closed network representative reality of a classified area and/or of a war zone. In some embodiments users may access the representative reality loaded directly on the computer device the user is utilizing to access the representative reality.

One of ordinary skill in the art, having had the benefit of the instant disclosure will recognize and appreciate that the steps of the flowchart of FIG. 3, or other flowcharts and descriptions contained herein, may be performed in a different order and/or may be performed multiple times to create the interactive representative reality. Moreover, one of ordinary skill in the art, having had the benefit of the instant disclosure will recognize and appreciate that one or more steps of the flowchart of FIG. 3, or other flowcharts and descriptions contained herein, may be omitted in creating portions or the entirety of the interactive representative reality. Similarly, one or more additional steps may be included in the creation of portions or the entirety of the interactive representative reality. It will be recognized and appreciated that one or more steps of the flowchart of FIG. 3 may be repeated to create a representative reality and may be repeated to update and/or expand the representative reality.

The embodiments described herein are not restricted to any specific brands or manufacturers of geospatial mapping, geotagging, photos, images or other products, service, or materials. Various applications, software codes, programs, or databases may be utilized to effectuate the invention herein described and accordance with the teachings herein.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer implemented method of creating an interactive representative reality system comprising:
   receiving, utilizing one or more processors, a plurality of media from a plurality of individual sources, said media including a plurality of images;
   compiling, utilizing said one or more processors, a plurality of geographically similar images of said images, individually resizing one or more of said geographically similar images, and stitching said geographically similar images to one another to thereby form a portion of a representative reality;
   wherein said portion of said representative reality is temporally layerable; and
   wherein said portion of said representative reality includes a plurality of singular objects each comprised of images from unique of said individual sources taken on unique dates;
   analyzing, utilizing said one or more processors, at least said geographically similar images utilized to create said portion of said representative reality for the presence of recognizable objects therein;
   linking, utilizing said one or more processors, at least some of said recognizable objects of said portion of said representative reality to at least one related item;
   enabling, utilizing said one or more processors, a user to replace at least some of said portion of said representative reality with a plurality of temporally distinct said geographically similar images not utilized to create said portion of said representative reality; and
   making, utilizing said one or more processors, at least some of said recognizable objects interactive recognizable objects within said portion of said representative reality, wherein said interactive recognizable objects are actuable and upon actuation by a user display information relative to said at least one related item.

2. The method of claim 1 further comprising the step of replacing at least some of said recognizable objects within said geographically similar images with predefined object media from a virtual item database.

3. The method of claim 2 wherein said predefined object media includes a plurality of three dimensional models.

4. The method of claim 3 wherein said predefined object media includes a plurality of high resolution images.

5. The method of claim 1 wherein said portion of said representative reality system is spatially layerable.

6. The method of claim 1 further comprising the step of linking some of said geographically similar images not utilized to create said portion of said representative reality with said portion of said representative reality and providing a link to enable a user to view one or more of said geographically similar images not utilized to create said portion of said representative reality when viewing said portion of said representative reality.

7. The method of claim 6 further comprising the step of enabling a user to temporally sort said geographically similar images not utilized to create said portion of said representative reality.

8. The method of claim 1 wherein said portion of said representative reality is of a smaller size than a city block, includes only objects lining a single street, and wherein said geographically similar images utilized to create said portion of said representative reality includes at least three images recorded on unique dates.

9. The method of claim 1 wherein said portion of said representative reality is spatially layerable and includes a plurality of images of said singular objects from different vantage points stitched together.

10. The method of claim 9 wherein said different vantage points include different viewing angles.

11. The method of claim 10 wherein said different viewing angles include interior viewing angles and exterior viewing angles.

12. The method of claim 1 wherein said portion of said representative reality includes a plurality of interchangeable time periods.

13. The method of claim 1 further comprising the step of linking at least some of said recognizable objects of said portion of said representative reality with geographic data from said geographically similar images in which they are contained.

14. The method of claim 13, wherein linked of at least some of said recognizable objects are otherwise non-geographically indexed.

15. The method of claim 14, further comprising the step of linking at least some of said recognizable objects of said portion of said representative reality with geographical data from other non-geographically similar images in which they are also contained.

16. A computer implemented method of creating an interactive representative reality system comprising:
   receiving, utilizing one or more processors, a plurality of media from a plurality of individual sources, said media including a plurality of images;
   compiling, utilizing one or more processors, a plurality of geographically similar images of said images, individually resizing one or more of said geographically similar images, and stitching said geographically similar images to one another to thereby form a portion of a representative reality;
   wherein said portion of said representative reality is temporally layerable and includes a plurality of interchangeable time periods; and
   wherein said portion of said representative reality includes a plurality of singular objects;
   analyzing, utilizing one or more processors, at least said geographically similar images utilized to create said portion of said representative reality for the presence of recognizable objects of said singular objects therein;
   linking, utilizing one or more processors, at least some of said recognizable objects of said portion of said representative reality to at least one related item;
   linking, utilizing one or more processors, at least some of said recognizable objects of said portion of said representative reality with geographic data from said geographically similar images in which they are contained;
   wherein linked of at least some of said recognizable objects are otherwise non-geographically indexed; and
   linking, utilizing one or more processors, at least some of said recognizable objects of said portion of said representative reality with geographical data from other non-geographically similar images in which they are also contained.

17. The method of claim 16 further comprising the step of making at least some of said recognizable objects interactive recognizable objects within said portion of said representative reality, wherein said interactive recognizable objects are actuable and upon actuation by a user display information relative to said at least one related item.

18. A computer-executable program tangibly embodied on a non-transitory computer-readable medium and adapted to be executed by a processor to perform a method for creating an interactive representative reality, the method comprising:
   receiving a plurality of media from a plurality of individual sources, said media including a plurality of images;
   compiling a plurality of geographically similar images of said images, individually resizing one or more of said geographically similar images, and stitching said geographically similar images to one another to thereby form a portion of a representative reality;
   wherein said portion of said representative reality is at least one of spatially layerable and temporally layerable; and
   wherein said portion of said representative reality includes a plurality of singular objects each comprised of images from unique of said individual sources taken on unique dates;
   analyzing at least said geographically similar images utilized to create said portion of said representative reality for the presence of recognizable objects therein;
   linking at least some of said recognizable objects of said portion of said representative reality to at least one related item;
   enabling a user to replace at least some of said portion of said representative reality with a plurality of temporally distinct said geographically similar images not utilized to create said portion of said representative reality; and
   making at least some of said recognizable objects interactive recognizable objects within said portion of said representative reality, wherein said interactive recognizable objects are actuable and upon actuation by a user display information relative to said at least one related item.

* * * * *